US010872156B2

(12) United States Patent
Schornack et al.

(10) Patent No.: US 10,872,156 B2
(45) Date of Patent: Dec. 22, 2020

(54) TYPESCRIPT SECURITY SCANNER

(71) Applicant: JPMorgan Chase Bank, N.A., New York, NY (US)

(72) Inventors: Laura J Schornack, Oak Park, IL (US); Anna Borowski, Park Ridge, IL (US); Sandeep V Chandan, Wheeling, IL (US); Sonia L D'Souza, Morton Grove, IL (US); Derek M Ferguson, Palos Park, IL (US); Daniel F Gleeson, Pleasant Prairie, WI (US); Sreevani Rachakonda, Palatine, IL (US); Kaushik Ravichandran, Schaumburg, IL (US); Ankit Shah, Niles, IL (US); Dayann Thompson, Bolingbrook, IL (US); Arunkumar Unniparambath, Hawthorn Woods, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 215 days.

(21) Appl. No.: 16/100,827

(22) Filed: Aug. 10, 2018

(65) Prior Publication Data

US 2019/0362077 A1    Nov. 28, 2019

Related U.S. Application Data

(60) Provisional application No. 62/544,054, filed on Aug. 11, 2017.

(51) Int. Cl.
| | |
|---|---|
| *G06F 21/57* | (2013.01) |
| *G06F 21/56* | (2013.01) |
| *G06F 8/51* | (2018.01) |
| *G06F 8/41* | (2018.01) |

(52) U.S. Cl.
CPC ............ *G06F 21/577* (2013.01); *G06F 8/41* (2013.01); *G06F 8/51* (2013.01); *G06F 21/563* (2013.01); *G06F 2221/033* (2013.01)

(58) Field of Classification Search
CPC ........ G06F 21/577; G06F 21/563; G06F 8/51; G06F 8/41; G06F 2221/033
See application file for complete search history.

(56) References Cited

U.S. PATENT DOCUMENTS

| | | | |
|---|---|---|---|
| 6,851,107 B1 * | 2/2005 | Coad | G06F 8/20 717/108 |
| 10,282,550 B1 * | 5/2019 | Sheridan | G06F 21/563 |
| 2004/0255277 A1 * | 12/2004 | Berg | G06F 11/3604 717/124 |
| 2010/0083240 A1 * | 4/2010 | Siman | G06F 16/245 717/144 |

* cited by examiner

*Primary Examiner* — Ellen Tran
(74) *Attorney, Agent, or Firm* — Greenblum & Bernstein, P.L.C.

(57) ABSTRACT

A method of scanning software code to identify security flaws or risks and reporting those flaws or risks to a software developer or other interested party, where the software code is written in a language for which a vulnerability scanner is not available.

18 Claims, 4 Drawing Sheets

TYPESCRIPT SECURITY SCANNER

CROSS REFERENCE TO RELATED APPLICATIONS

This application claims priority to U.S. Provisional application 62/544,054 filed on Aug. 11, 2017 and incorporated herein by reference in its entirety.

FIELD

The present invention relates generally to a method of scanning software code to identify security flaws or risks.

BACKGROUND OF THE INVENTION

JavaScript® is a popular programming language frequently used by web browsers and other user interface applications. Various other languages have been developed that allow software developers to leverage some of the capabilities of JavaScript® while adding additional capabilities or increased programming efficiency. Examples of these languages include CoffeeScript, Dart, and TypeScript. While these alternative languages offer certain programming advantages and are increasing in popularity, they generally do not yet have the robust level of support that is enjoyed by JavaScript®. In particular, security vulnerability scanning may not be supported or may otherwise be less readily available for these alternative languages whereas such scanning may readily be performed for more common and established languages such as JavaScript®. In most circumstances, software code that was not produced in a language that may be scanned with an available software tool will require manual review. This manual review process requires that a reviewer carefully analyze the software code to detect potential vulnerabilities. This manual review process can be time consuming and requires an experienced resource. Thus, this type of review process is expensive. As a result, software code produced in TypeScript and other such alternative languages may be more difficult and expensive to scan for vulnerabilities with the result being either delays in the introduction of new software or the release into a production environment of software that has not been subject to rigorous vulnerability assessment. What is needed are systems and methods for easily and cost effectively scanning software code produced in languages that are less established than languages such as JavaScript. Such systems and methods should clearly indicate what portion of the software code is causing the generation of the alert.

SUMMARY

Embodiments of the present invention comprise methods of scanning software source code to reduce the risk of security and other vulnerabilities. In particular, embodiments of the invention allow the scanning of software source code by converting a first source code developed in a programming, script, or other type of software instruction language that may not be supported directly by vulnerability scanners into a second source code that may be scanned by available vulnerability scanners. In such embodiments, the second source code is scanned and identified vulnerabilities are then mapped back to the first source code. Embodiments of the invention may receive a first set of software instructions coded in a first software language, transpile them into a second set of software instructions coded in a second software language, map the second set of instructions to the first set of instructions, scan the result of the transpilation for vulnerabilities, and use the map combined with any detected vulnerabilities to associate the vulnerabilities found in the second set of instructions to their source in the first set of instructions. This association allows the developer of the first set of instructions or other such party to easily identify the detected vulnerabilities and make appropriate corrections. Typically, the first set of software instructions and the second set of software instructions are in the form of source code which is in a human-readable form. In another embodiment of the invention, the transpiled code may be subject to a de-obfuscation process that produces a second map which is used in combination with the first map to associate vulnerabilities detected in the second set of software instructions back to the first set of software instructions.

BRIEF DESCRIPTION OF THE DRAWINGS

These and other features and advantages of the present invention will become better understood with regard to the following description and accompanying drawings in which.

DETAILED DESCRIPTION

Figure 1:
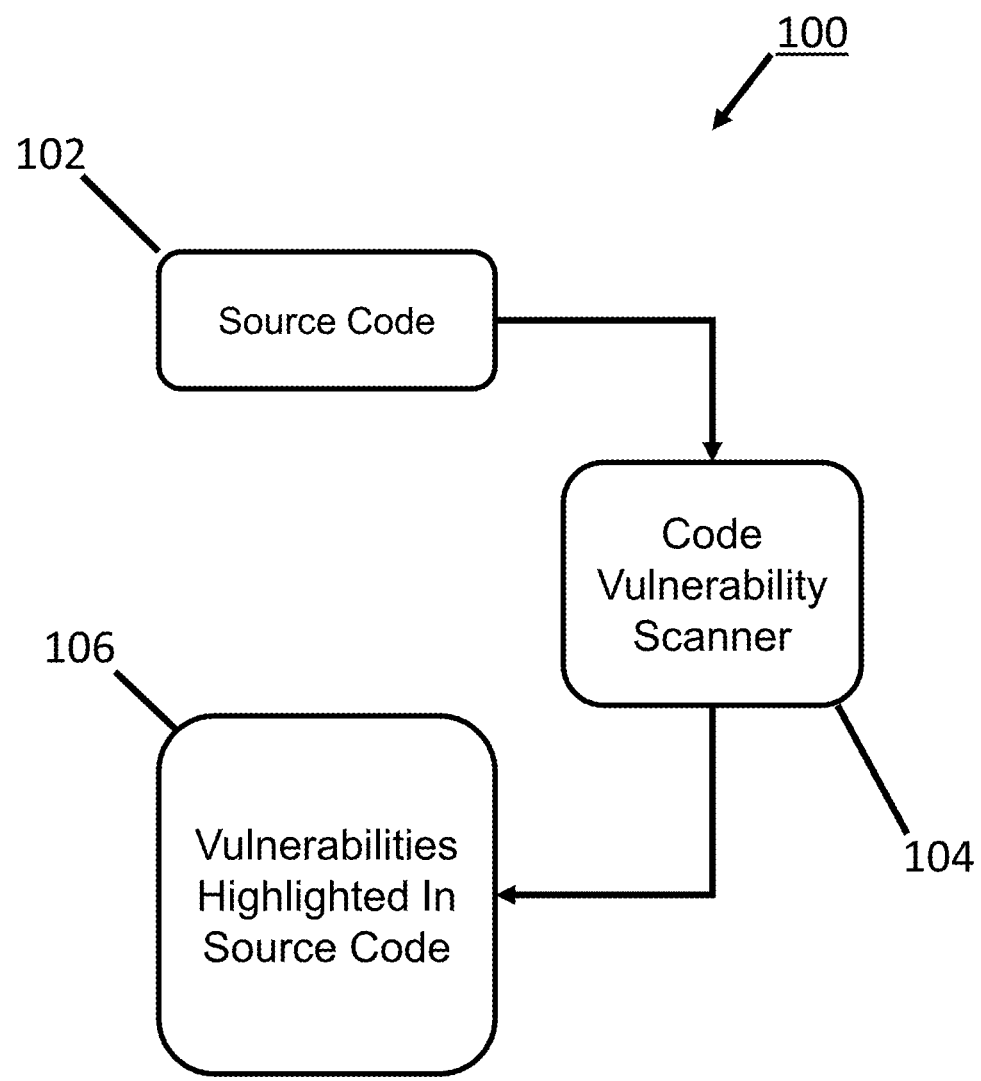
FIG. 1 is a block diagram of a known method of scanning software code for vulnerabilities.

FIG. 1 illustrates a conventional method of scanning software source code 100. As illustrated, the source code 102 is provided to a code vulnerability scanner 104. The code vulnerability scanner 104 then generates a list of vulnerabilities which are identified in a copy of the source code 106. This method permits a software developer or other interested party to easily review potential vulnerabilities in the source code and make corrections thereto. The shortcoming of this known approach is that it requires a code vulnerability scanner 104 that is capable of scanning source code written in a particular programming language. This may be relatively easy to overcome as long as the source code is written in a popular or established programming language. However, new programming languages are frequently developed, many of which provide significant enhancements to more established and popular programming languages. As a result of these enhancements, it may be desirable for programmers to have access to and use these new languages for certain programming tasks. However, as was noted earlier herein, vulnerability scanners may not be readily available for these new programming languages. In other cases, the software developer or other interested party may simply have a code vulnerability scanner adapted for a different programming language than that in which the source code is being generated. The result is that new source code may have to be manually scanned or be introduced into a production environment without a comprehensive vulnerability scan. As will be appreciated by one ordinarily skilled in the art, manual scanning for such vulnerabilities can be an expensive and time-consuming process. Furthermore, manual scanning may be less reliable owing to human error. The result is increased operating costs, delays in the introduction of new software, or exposure of the organization to software vulnerabilities that result from the introduction of software code that may not have been thoroughly or accurately scanned for security risks. In order to address these and other problems, the general inventive concepts contemplate the scanning of software code written in a first language using a vulnerability scanner intended for a second language.

As used herein, the term "transpiler" refers to a software program that converts source code written in a first programming language into source code written in a second programming language. Transpilers may alternatively be known as source-to-source compilers or transcompilers. Transpilers generally receive source code written in a first programming language and convert that received code into a different source code. The example used herein is a transpiler that converts source code written in TypeScript to JavaScript® source code, but the general inventive concepts are not intended to be limited to these specific programming languages. As used herein, the term "code" refers to software instructions.

Figure 2:
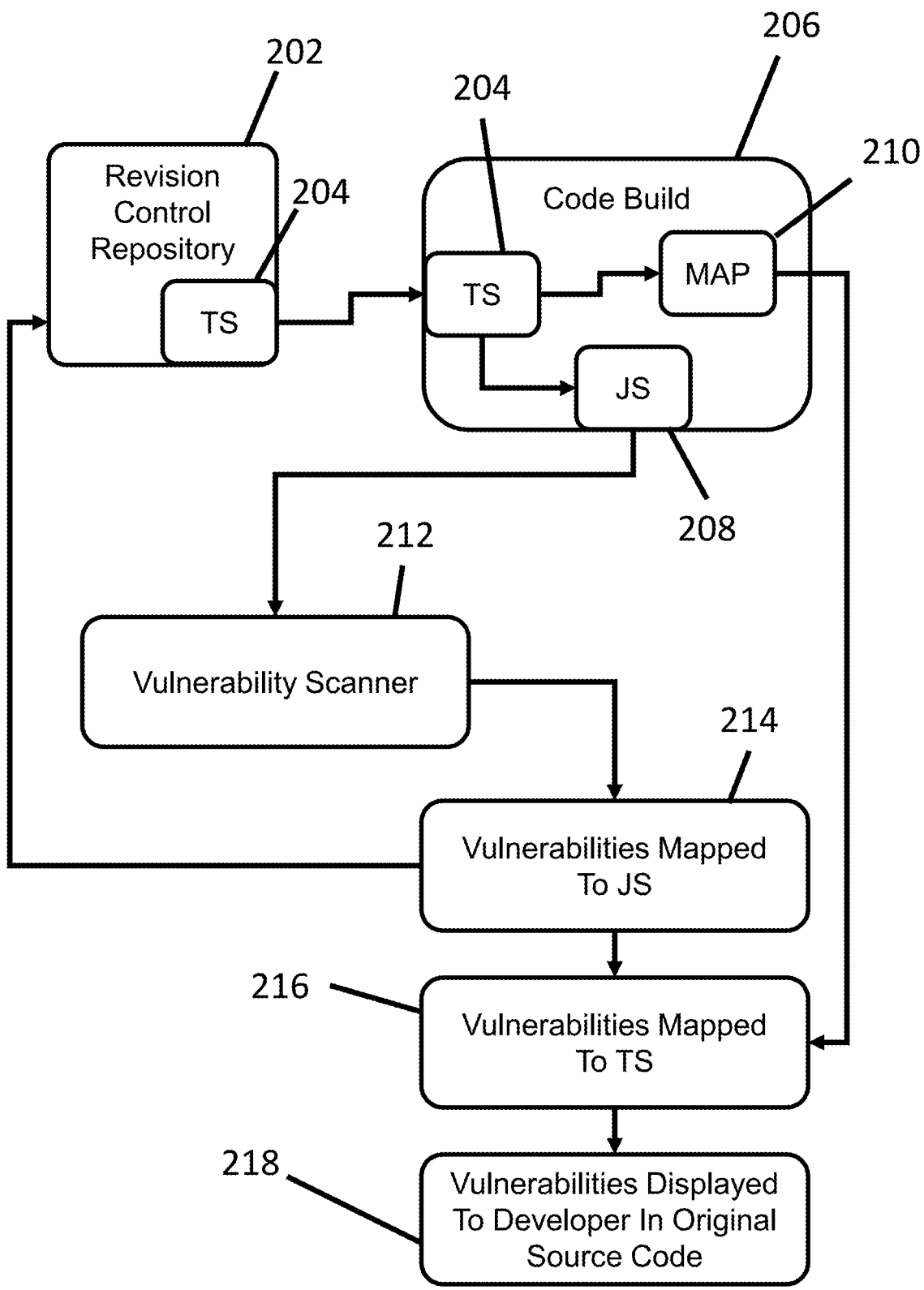
FIG. 2 is a block diagram of an exemplary embodiment of the invention.

As is illustrated in FIG. 2, an exemplary embodiment of the invention comprises a storage location 202 that contains a first software code 204. In this exemplary embodiment, the first software code 204 is written in the TypeScript language. In the embodiment illustrated in FIG. 2, the first software code 204 is copied into a code build system 206. The code build system then transpiles the first software code 204 into a second software code 208. In this exemplary embodiment, the second software code is JavaScript® code. The transpiler produces a map file 210 that cross-references elements of the transpiled, second software code 208 to corresponding elements of the first software code 204. If the map file 210 is not produced automatically by the transpiler, embodiments of the invention may produce a cross-reference map file 210 by another means where such means is preferably automated.

The second software code 208 is provided to a vulnerability scanner 212. This vulnerability scanner 212 may be optimized for the language that would be used to interpret the second software code 208. The vulnerability scanner 212 produces a list of vulnerabilities 214 that are mapped to the second software code 208.

The map file 210 produced during the transpilation process is applied to the generated list of vulnerabilities 214 in order to correlate the vulnerability locations in the second software code 208 to those locations in the first software code 204 as mapped during the process of transpiling the first software code 204 to the second software code 208.

Figure 3:
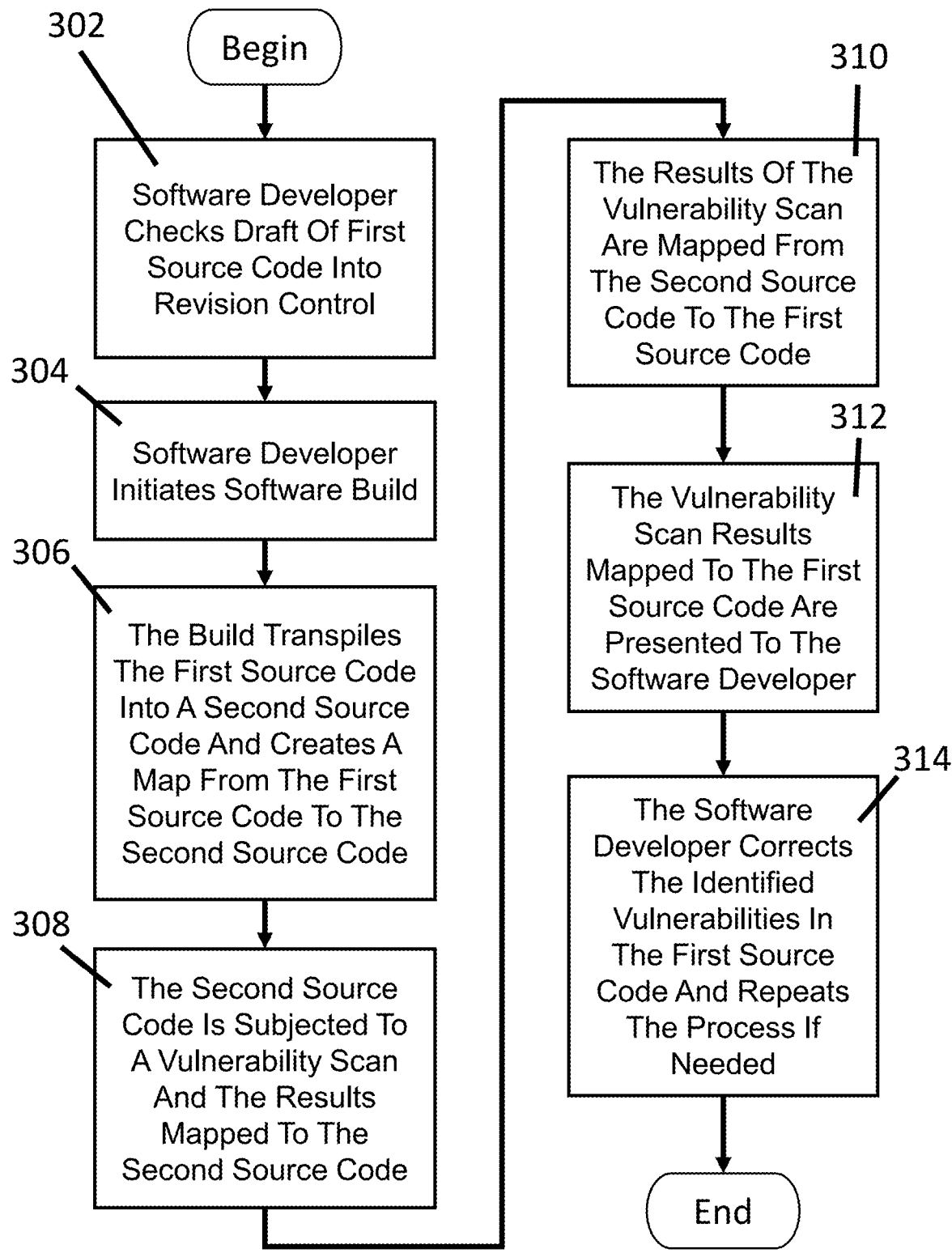
FIG. 3 is a flow chart of the steps taken by an exemplary embodiment of the invention in order to identify vulnerabilities in a source document.

The processing associated with the embodiment diagrammed in FIG. 2 is further illustrated with reference to the flow chart of FIG. 3. In step 302, a draft of a software code file (i.e., the first software code 204) is checked into a revision control or other storage system. The developer then initiates the software build process 304. During this build process, the software code is transpiled in step 306. The transpilization process creates a second software code 208 from the first software code 204. This process also creates a map file 210 that serves as an index for correlating locations (e.g., lines, columns, structures) in the first software code 204 to corresponding locations in the second software code 208. As was discussed earlier herein, the first software code 204 may be written in a software language for which there are no automated vulnerability scanners available. Thus, in general, the second software code 208 should be one for which at least one vulnerability scanner 212 is available. In step 308, the second software code 208 is scanned by the vulnerability scanner 212. The result is a list of vulnerabilities 214 and their location in the second software code 208. The vulnerability scanner 212 may identify a vulnerability in a specific line and operator in the second software code 208. In step 310, the result of this scan is mapped 216 from the second software code 208 to the first software code 204. For example, the vulnerability scanner 212 may detect a risk at line ten of the second software code 208. Using the map file 210 created during the transpiling process, the process then determines which line in the first software code 204 corresponds to line ten of the second software code 208. This is repeated for each risk identified by the vulnerability scanner 212. The result of this mapping is a listing of vulnerabilities 216 comprised of the identified vulnerabilities and their locations in the first software code 204.

In step 312, the mapped vulnerabilities are then presented 218 to the software developer or other person in a user interface so that the cause of each vulnerability may be considered and corrected as needed. As is shown in step 314, the developer or other interested party may make any necessary changes to the first software code 204 and repeat the process starting at step 302 in order to verify that the changes made resolved the detected vulnerabilities. In other embodiments of the invention, the listing of vulnerabilities and mapped locations 216 along with the mapped locations of those vulnerabilities may be provided to the software developer or other person in the form of an email. Other embodiments may provide the listing of vulnerabilities and mapped locations 216 in an output file. Still other embodiments may provide the listing of through the use of a URL which directs the viewer to a web-page which comprises the information. The above list is not intended to be limiting as other methods of presenting the listing of the locations of the vulnerabilities in the first software code 204 are contemplated by the invention.

Figure 4:
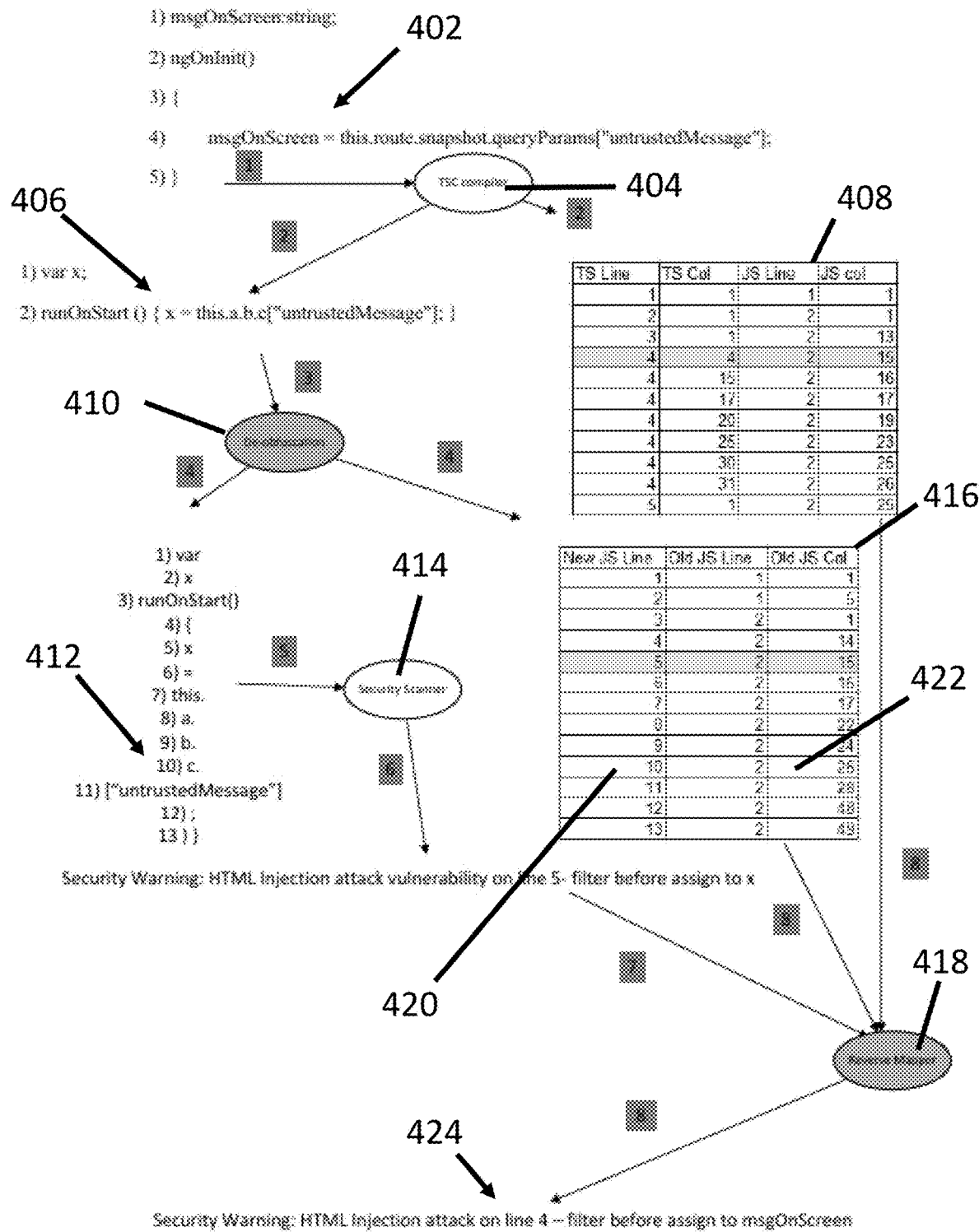
FIG. 4 is a block diagram of an exemplary embodiment of a mapping process used to map vulnerabilities detected in a transpiled document back to the original document.

As was described above, the mapping of detected vulnerabilities from the second software code 208 to the first software code 204 is critical to allow a developer to identify the portion of the first software code 204 that gave rise to the vulnerability detected in the second software code 208. By way of example, as shown in FIG. 4, a first portion of code 402 written in a first language is provided to a transpiler 404 that converts the first portion of code into a second portion of code 406 written in a second programming language. In addition to the second portion of code 406, the transpiler 404 also produces a cross-reference map 408. This cross-reference map 408 relates those elements of the first portion of code 402 to corresponding elements in the second portion of code 406. For example, as illustrated in the fourth line of the cross-reference map 408, line 4, column 4 of the first portion of code 402 corresponds to line 2, column 15 of the second portion of code 406. The transpiled second portion of code 406 is then subjected to a vulnerability scanner 212 and the detected vulnerabilities compiled into a list. The cross-reference map 408 is used to identify the location in the first portion of code 402 that corresponds to the location in the second portion of code 406 for each detected vulnerability on the list. These locations in the first portion of code 402 therefore correspond to the locations in the second portion of code 406 that gave rise to the detected vulnerabilities.

In another exemplary embodiment, the second portion of code 406 is further subjected to a de-obfuscation process 410 that moves the code elements from rows with a plurality of columns as illustrated in the second portion of code 406 to a third portion of code 412 wherein the code elements are arranged into rows, each containing a single element. The de-obfuscation process 410 produces a second cross-reference map 416. This third portion of code 412 is then input to the vulnerability scanner 414. Vulnerabilities identified by the scanner 414 in the third portion of code 412 are then supplied to a reverse mapping function 418 which references each identified vulnerability, and using first cross-reference map 408 and the second cross-reference map 416, references the identified vulnerability back to its source in the first portion of code 402. For example, suppose that a vulnerability was detected in line ten of the third portion of code 412. As is illustrated in FIG. 4 at 420, a vulnerability detected in line ten of the third portion of code 412 may be cross-referenced to line two, column twenty-six 422 of the second portion of code 406. The first cross reference map 408 is applied to this location in order to determine that the corresponding location in the first portion of code 402 is line four, column thirty-one. Thus, the vulnerability in line ten of the third portion of code 412 corresponds to line four, column thirty-one of the first portion of code 402. In some exemplary embodiments, a message 424 may be presented to a user that identifies the detected vulnerability and its location in the first portion of code 402. Accordingly, the general inventive concepts (including the exemplary embodiments disclosed herein) allow a user to leverage available vulnerability scanners to detect vulnerabilities in transpiled programming code and then quickly and easily reference those portions of the original code that give rise to the detected vulnerabilities.

While the present invention has been illustrated by the description of embodiments thereof, and while the embodiments have been described in considerable detail, it is not the intention of the Applicant to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

What is claimed is:

1. A system for scanning software code, the system comprising:
   a repository which comprises a first set of software instructions that includes a first set of software source code created in a first programming language;
   a code build system which comprises a transpiler to which the first set of software instructions are provided;
   processing instructions which cause the transpiler to transpile the first set of software instructions to generate a second set of software instructions that includes a second set of software source code created in a second programming language that is readable by a code scanner;
   processing instructions that cause the transpiler to generate a cross reference map file which maps items in the second set of software instructions to corresponding items in the first set of software instructions;
   the code scanner to which the second set of software instructions are provided;
   processing instructions that cause the code scanner to scan the second set of software instructions and produce a scan result of that scan that includes at least one source code segment of interest; and
   processing instructions that cause the code build system to match the scan result produced by the code scanner to elements of the first set of software instructions using the cross reference map file to produce a matched result that includes a location in the first set of software instructions corresponding to the at least one source code segment.

2. The system of claim 1, further comprising software instructions to generate a web page which displays the matched result.

3. The system of claim 1, further comprising:
   a display device in communication with the code build system; and
   processing instructions that cause the code build system to display the matched result.

4. The system of claim 1, further comprising:
   processing instructions that cause the code build system to store the matched result.

5. The system of claim 1, wherein the code scanner is a vulnerability scanner.

6. The system of claim 1, where the cross reference is a map file associating the location of elements from the first set of software instructions to the location of corresponding elements in the second set of software instructions.

7. A system for scanning software code, the system comprising:
   a repository which comprises a first set of software instructions that includes a first set of software source code created in a first programming language;
   a code build system which comprises a transpiler to which the first set of software instructions are provided;
   processing instructions which cause the transpiler to transpile the first set of software instructions to generate a second set of software instructions that includes a second set of software source code created in a second programming language that is readable by a code scanner;
   processing instructions which cause the code build system to subject the second set of software instructions to a de-obfuscation process which produces a third set of software instructions that includes a third set of software source code which are arranged into rows, each row having a single code element;
   processing instructions that cause the transpiler to generate a first cross reference map file which maps items in the second set of software instructions and corresponding items in the first set of software instructions;
   processing instructions that cause the transpiler to generate a second cross reference map file which comprises references between items in the third set of software instructions and corresponding items in the first set of software instructions;
   the code scanner to which the third set of software instructions are provided;
   processing instructions that cause the code scanner to scan the third set of software instructions and produce a matched result that includes at least one source code segment of interest; and
   processing instructions that cause the code build system to match the scan result to elements of the first set of software instructions using the first cross reference map file and the second cross reference map file to produce a matched result that includes a location in the first set of software instructions corresponding to the at least one source code segment.

8. The system of claim 7, further comprising software instructions to generate a web page which displays the matched result.

9. The system of claim 7, further comprising:
a display device in communication with the code build system; and
processing instructions that cause the code build system to display the matched result.

10. The system of claim 7, further comprising:
processing instructions that cause the code build system to store the matched result in an output file.

11. The system of claim 7, wherein the code scanner is a vulnerability scanner.

12. The system of claim 7, where the first cross reference is a map file associating the location of elements from the first set of software instructions to the location of corresponding elements in the second set of software instructions and the second cross reference is a is a map file associating the location of elements from the second set of software instructions to the location of corresponding elements in the third set of software instructions.

13. A method of scanning software code, the method comprising:
receiving a first set of software instructions that includes a first set of software source code created in a first programming language;
transpiling the first set of software instructions to generate a second set of software instructions that includes a second set of software source code created in a second programming language that is readable by a code scanner;
generating a first cross reference map file which maps items in the second set of software instructions to corresponding items in the first set of software instructions;
scanning the second set of software instructions to produce a scan result that includes at least one source code segment of interest; and
matching the scan result produced by the code scanner to elements of the first set of software instructions using the first cross reference map file to produce a translated result that includes a location in the first set of software instructions corresponding to the at least one source code segment.

14. The method of claim 13, further comprising generating a web page which displays the matched result.

15. The method of claim 13, further comprising displaying the result and the matched elements on a display device.

16. The method of claim 13, further comprising storing the matched result in an output file.

17. The method of claim 13, wherein the code scanner is a vulnerability scanner.

18. The method of claim 13, wherein the cross reference is a map file associating the location of elements from the first set of software instructions to the location of corresponding elements in the second set of software instructions.

* * * * *